UNITED STATES PATENT OFFICE.

WILLIS A. GIBBONS, OF NEW YORK, N. Y., ASSIGNOR TO REVERE RUBBER COMPANY, A CORPORATION OF RHODE ISLAND.

METHOD OF MAKING TENNIS BALLS AND LIKE HOLLOW ARTICLES.

1,415,437. Specification of Letters Patent. Patented May 9, 1922.

No Drawing. Application filed August 24, 1921. Serial No. 494,868.

*To all whom it may concern:*

Be it known that I, WILLIS A. GIBBONS, a citizen of the United States, residing in New York, county of New York, and State of New York, have invented new and useful Improvements in the Method of Making Tennis Balls and like Hollow Articles, of which the following is a full, clear, and exact description.

This invention relates to the manufacture of hollow rubber articles, particularly to that inflated type thereof known as tennis balls.

Very exacting requirements must be met by the manufacturers of tennis balls. Rigorous tests as to resiliency, adhesion of the felt cover to the center, elasticity of the center, reflection on rebound, weight, diameter, roundness and retentivity of weight and pressure after a certain length of play, are imposed by the U. S. N. L. T. A. Ball Committee. These requirements, of course, have to be met.

In meeting the requirements, the manufacturers have heretofore followed a "re-inflation" method or a "trapped inflation" method. According to the former, the center was cured in a mold with enclosed volatile substances which created an internal fluid pressure, forcing the vulcanizable rubber composition to take the shape of the molding cavity. After vulcanization and cooling, the volatile gases were either dissolved or converted back into a liquid. These volatile gases were usually either water vapor, ammonia, or carbon dioxide. The water vapor, of course, condensed when the temperature of the center reached the normal, and both ammonia and carbon dioxide are more or less soluble in water, seven hundred volumes of ammonia, for instance, dissolving in about one volume of water. And both ammonia and carbon dioxide pass through rubber more rapidly than air or nitrogen. And therefore, in this old method of manufacture, the balls diminished in size and bounce and had to be re-inflated after curing. To accomplish re-inflation, it was necessary to initially provide an unvulcanizable green or softly cured plug on the interior of the center through which a hypodermic needle could be thrust for the injection of air to the desired inflating pressure. The non-curing plug was relied upon to close and seal the opening left by withdrawing the needle. Some times it failed, and at all times it offered a possible source of leakage. And the unvulcanized plug threw the ball out of balance.

The second and more recent method consisted in trapping air between two semi-spherical halves when they were brought together in a container or chamber filled with air at the desired pressure. But in commercial practice, this method required a preliminary semi-curing treatment of the halves of the center.

The present invention in general seeks to improve upon these methods of manufacturing tennis balls. It aims to eliminate the unbalancing raw gum plug, the necessity of re-inflating the ball with air, and the necessity of partially curing the halves or sections of the rubber center. And it aims to obviate these objections by a method of manufacture which is less expensive than those heretofore employed and requires no costly apparatus or manipulation.

With the preferred embodiment of the invention in mind, and without intention to limit its scope more than is required by the prior art, the invention may be said to consist in enclosing within the unvulcanized rubber center a definite quantity of a material that is capable of creating an internal fluid pressure, during the cure, so as to make the article take the shape of the mold cavity, the internal fluid pressure being maintained at a predetermined degree, after vulcanization and cooling, by reason of the essentially insoluble or permanent character of the gas generated within the article during the cure which acts to distend the center to the right size after removal from the mold. And preferably, the internal fluid pressure is derived from a gas that is relatively impermeable so that the playing life of the ball is increased.

According to my invention, and referring for the present to the preferred method of manufacture by way of example only, I take a sheet of vulcanizable rubber of suitable composition and thickness, and cut it into sections, which may be put together to form what is termed in the art "a center." I enclose in the center, a mixture of sodium nitrite and ammonium chloride. On heating, these re-act and generate nitrogen according to the following formula:—

$$NH_4Cl + NaNO_2 = NaCl + N_2 + 2H_2O$$

Theoretically, only .532 gram of ammonium chloride is required with .7 gram of sodium nitrite, but I prefer to employ a slightly larger quantity thereof, say .6 gram of $NH_4Cl$, and to regulate the quantity of gas developed by accurate measurement of only one of the ingredients, to wit, sodium nitrite, the last named being the most convenient. On placing the above mentioned mixture in a mold and using exactly .7 gram of sodium nitrite, nitrogen gas is developed according to the equation. The above stated quantities produce approximately 245 cc. of nitrogen gas at ordinary temperatures and pressures. When confined in the mold during the vulcanizing treatment, the pressure is, of course, increased, and in the finished center, after vulcanization and removal from the mold, a pressure of about 22.4 pounds per square inch is obtained above the atmosphere, varying, of course, with the character of the stock and degree or extent of the cure.

And after the center has been vulcanized and cooled, it is removed from the mold and covered with a fabricated fibrous material suited for play—felt is in accepted usage. The cover-sections may be either cemented to the center and their edges stitched together, or the sections may be united more or less integrally to the center with a vulcanizable cement without the use of threads or stitches and in a cover mold.

The center curing and inflating mold may be of any suitable split sectional type, having a spherical cavity of a size suited to the rubber composition employed. Satisfactory results have been obtained with molds from $2\frac{3}{32}$ to $2\frac{3}{8}$ of an inch internal diameter. But this factor, i. e., the allowance that must be made for the distention of the ball by the inflating medium after it is taken out of the mold, is the same (at least in principle) in the present method as in the old reinflating method and those skilled in the art need no further directive description.

In the preferred method above described in detail the proportion of ammonium chloride and sodium nitrate may be derived from the molecular weights of the two substances. The quantity of the inflating fluid, nitrogen in the example given, that it is necessary to liberate by the reaction of the substances, may be calculated from tables showing the volume of a given weight of nitrogen at standard temperature and pressure. And by making due allowance for the difference between the room and the standard temperatures and by allowing for the air that is trapped in the center when the same is initially assembled (about 44 cc. in the instant case), the quantity of inflating gas necessary may be arrived at. And knowing that half of the nitrogen is furnished by the sodium nitrite, the quantity of sodium nitrite necessary to furnish half the requisite volume of free nitrogen is readily figured. From the proportion between the two substances (determined by their relative molecular weights) the quantity of ammonium chloride necessary may be determined. As before stated, it is preferred to use a quantity of ammonium chloride slightly in excess and to accurately regulate only the quantity of sodium nitrite introduced in the center. It is noted that the theoretical figures check very closely with the final pressures obtained. That is to say, .5, .6 and .7 grams of sodium nitrite, respectively, have produced with ammonium chloride in excess of the theoretical (.6 gram in all three cases), a volume of nitrogen sufficient to not only shape the center during the cure, but to maintain it inflated after curing at a pressure suitable for playing and around 12.5–17.4 and 22.4 pounds to the square inch.

For the sake of clearness, and by way of caution, it is also to be noted that the total final pressure existing in the center, after curing and removal from the mold, depends on the following factors:—

(1) The volume of the hollow center (which may be kept constant by dieing out the sections from unvulcanized sheet stock, or snipping off lengths from a tube thereof);

(2) The quantity of chemicals introduced, and (3) The stretch or distensibility of the cured stock (which will vary with the nature of the compound and the thoroughness or extent of cure).

By keeping the above mentioned factors constant, however, articles can be produced satisfactorily uniform in size and inflation pressure.

The invention is not limited, however, to the specific method above described. The ingredients used to charge the center for the purpose of inflation may be used dry and put in either mixed or separately. Or they may be introduced in the form of a solution of either or both of them. Or a solution of either or both of them may be rendered solid by admixture of agar-agar, or other gelatinizing substance, for instance, to a 30% solution of ammonium chloride, 5 to 15% of agar-agar may be added. The use of a gel is of particular advantage in that it not only prevents the chemicals intermingling and prematurely evolving gas before heat is applied in vulcanizing, but also, after heating and curing, leaves on the interior of the center a gummy lining whose consistency is intermediate a thin liquid and a solid. Agar-agar may, if desired, be so employed as a protective coating, preventing, or reducing, exit of the inflating gas or fluid, without detracting from the flexibility of the center and impairing the playing qualities of the ball.

It is to be understood that the invention is not limited to the charging ingredients mentioned. Instead of ammonium chloride and sodium nitrite, the following substances may be used with more or less satisfactory results:—

1. Any ammonium salt and any nitrite, giving nitrogen, according to the following formula:—

$$(NH_4)_2SO_4 + 2NaNO_2 = Na_2SO_4 + 2N_2 + 4H_2O$$

2. Sodium peroxide and water, giving oxygen, according to the following formula:—

$$2Na_2O_2 + 2H_2O = 4NaOH + O_2$$

3. Barium peroxide and acid, giving hydrogen peroxide and eventually oxygen, according to the following equation:—

$$2BaO_2 + 2H_2SO_4 = 2BaSO_4 + 2H_2O + O_2$$

4. Hydrogen peroxide, giving oxygen and water, according to the following formula:—

$$2H_2O_2 = 2H_2O + O_2$$

5. In general any organic compound, and combination of compounds, which on heating gives up nitrogen in large amounts and is, therefore, useful for inflating purposes.

6. A mixture of some alkali, or alkaline earth, and ammonium salt, as, for instance:—

$$2NH_4Cl + 2BaO = 2NH_3 + BaCl_2 + Ba(OH)_2$$

This mixture works quite satisfactorily for the purpose of forming the ball and maintaining it inflated but the degree of inflation is more difficult to control than with mixtures which yield nitrogen. In the presence of water, these alkaline substances re-act to form ammonia gas which is prevented from re-dissolving by the mixed alkali or alkaline earth present which latter should be used in excess.

From the foregoing examples, it will be obvious that the principle of the present invention may be practiced with a wide variety of substances and, in its broadest scope, the invention is believed to comprehend the use of any chemicals in a pre-determined quantity that will re-act or break-down, on heating, (referring to sodium nitrite alone) to yield a gas or gases furnishing an internal fluid pressure on the center not only during the cure, so as to conform the walls of the plastic to the molding cavity, but also to maintain the center inflated to a pre-determined pressure suitable for play and at a pre-determined size. In the case of tennis balls, the inflating pressure may be varied to suit the stock from say 10 to 25 pounds to the square inch in excess of the atmospheric pressure.

In the claims I have referred to the pressure within the center after the same has been cured and cooled down as "a predetermined pressure" and by this I mean a pressure suited for the type of hollow ball that is to be marketed. Tennis balls for instance, to which this invention primarily pertains, at the present day are filled with air under a pressure approximating 15 lbs., above the atmosphere. Of course the pressure may be varied as desired but it is hardly conceivable that a useful tennis ball could be made with less than 10 lbs., internal pressure. The term "predetermined pressure" in the claims is therefore intended to mean a substantial pressure suited to the type of ball, in tennis balls for example at least above 10 lbs.

Various ways in which the chemicals may be introduced or enclosed in the center have already been mentioned, but supplementarily, it is noted that if the chemicals are used in the form of jells, they may be died out, as from a sheet, to obviate weighing. A further alternative consists in making an accurate solution of one of the ingredients, for example, sodium nitrite, and measuring it with a simple volumetric measure, such as a pipette or graduate. Reference should, therefore, be made to the appended claims for an understanding of the scope of the invention.

Having thus described my invention, what I claim and desire to protect by Letters Patent is:

1. A method of making hollow articles of vulcanized rubber composition which consists in curing the articles in a mold and simultaneously creating within the articles an internal fluid pressure which, during the cure, shapes the composition to the mold and, after the cure, maintains the article inflated to shape and size at a pre-determined pressure suited for the contemplated use.

2. A method of making tennis balls having relatively thin walls and a prescribed weight, bounce and size which consists in, forming a center of vulcanizable rubber composition and enclosing therewithin a pre-determined quantity of material capable of yielding (on heating to a vulcanizing temperature and in a molding cavity) a desired internal fluid pressure, curing and inflating the center in one operation in a mold, and finally covering the cured and shaped center at a thus derived pre-determined internal pressure and size.

3. A method of making tennis balls which consists in forming a center of vulcanizable rubber composition and enclosing therewithin between .5 and .7 grams of sodium nitrite and an excess of ammonium chloride, curing and simultaneously inflating the charged center in a mold, and finally covering the cured center while maintained inflated to size by an internal pressure of at least ten pounds to the square inch above the atmosphere.

4. A method of making tennis balls which consists in forming a center of vulcanizable rubber composition and enclosing therewith a pre-determined quantity of material capable of yielding (on heating in a mold cavity to a vulcanizing temperature) a gas insoluble in the materials present and capable of producing a definite internal pressure, curing the center in a mold and simultaneously shaping and inflating it with a gaseous medium of low permeability to rubber, and finally covering the center with a fabricated fibrous material while it is maintained to size and inflated by said gaseous medium at an internal fluid pressure sufficient for playing purposes.

5. That method of making tennis balls which consists in completely shaping, curing and charging their vulcanizable rubber centers with an inflating gaseous medium in one operation in a mold, and subsequently while maintained to size and under a pre-determined internal pressure covering the centers.

6. A method of making hollow rubber balls with deformable and flexible external walls which consists in assembling a quantity of vulcanizable rubber composition whose distensibility after curing is known to form a hollow body, and simultaneously enclosing therewithin material capable of yielding on heating a pre-determined mass of gas, introducing the hollow vulcanizable rubber body in a mold, curing the body in spherical form with its walls of substantially uniform distensibility while generating an inflating pressure therewithin, removing the vulcanized center and simultaneously allowing it to expand to size and to diminish in pressure to a final pre-determined amount.

Signed at New York, county of New York, State of New York, this 15 day of August, 1921.

WILLIS A. GIBBONS.